US010489658B2

(12) United States Patent
Okada

(10) Patent No.: US 10,489,658 B2
(45) Date of Patent: Nov. 26, 2019

(54) VIDEO PROCESSING DEVICE

(71) Applicant: SONY INTERACTIVE ENTERTAINMENT INC., Tokyo (JP)

(72) Inventor: Michihiro Okada, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 15/545,525

(22) PCT Filed: Oct. 7, 2015

(86) PCT No.: PCT/JP2015/078478
§ 371 (c)(1),
(2) Date: Jul. 21, 2017

(87) PCT Pub. No.: WO2016/125339
PCT Pub. Date: Aug. 11, 2016

(65) Prior Publication Data
US 2018/0012075 A1 Jan. 11, 2018

(30) Foreign Application Priority Data
Feb. 3, 2015 (JP) .................. 2015-019143

(51) Int. Cl.
H04N 5/93 (2006.01)
G11B 27/00 (2006.01)
(Continued)

(52) U.S. Cl.
CPC ....... G06K 9/00744 (2013.01); G06F 3/0485 (2013.01); G11B 27/102 (2013.01);
(Continued)

(58) Field of Classification Search
USPC ................ 386/278, 282, 280, 239
See application file for complete search history.

(56) References Cited

U.S. PATENT DOCUMENTS 7,055,168 B1 * 5/2006 Errico ............... G06F 17/30029
348/E7.061
8,566,315 B1 * 10/2013 Davtchev .......... G06F 17/30817
707/736
(Continued)

FOREIGN PATENT DOCUMENTS

JP 2006-279267 A 10/2006
JP 2007-89088 4/2007
(Continued)

OTHER PUBLICATIONS

Notification of Reason for Refusal dated Mar. 13, 2018, from the corresponding Japanese Patent Application No. 2016-573173, pp. 1 through 18.
(Continued)

Primary Examiner — Daquan Zhao
(74) Attorney, Agent, or Firm — Katten Muchin Rosenman LLP

(57) ABSTRACT

To provide a video processing device that allows a user to quickly search for a desired scene while at the same time easily confirming details of an image string. There is provided a video processing device that acquires a first image string and a second image string different from each other that are made up of a plurality of frame images extracted from a video of interest, that performs control such that the first image string is shown on a display device screen as an image string of interest, that causes the frame images included in the first image string to scroll in response to a scrolling operation by the user while the first image string is shown, and that switches the image string of interest from the first image string to the second image string if the scrolling operation satisfies a given determination condition.

9 Claims, 5 Drawing Sheets

(51) Int. Cl.
*G06K 9/00* (2006.01)
*G06F 3/0485* (2013.01)
*H04N 21/472* (2011.01)
*G11B 27/34* (2006.01)
*G11B 27/10* (2006.01)
*H04N 21/431* (2011.01)
*H04N 21/482* (2011.01)
*H04N 21/845* (2011.01)
*H04N 9/80* (2006.01)
*H04N 5/765* (2006.01)

(52) U.S. Cl.
CPC ........... *G11B 27/34* (2013.01); *H04N 21/431* (2013.01); *H04N 21/472* (2013.01); *H04N 21/47217* (2013.01); *H04N 21/4828* (2013.01); *H04N 21/8453* (2013.01); *H04N 21/8456* (2013.01)

(56) References Cited

U.S. PATENT DOCUMENTS

| | | | | |
|---|---|---|---|---|
| D692,915 | S * | 11/2013 | Brinda | D14/488 |
| 8,826,123 | B2 * | 9/2014 | Audet | G06F 17/241 |
| | | | | 715/200 |
| 9,613,167 | B2 * | 4/2017 | Cassistat | G06F 17/30994 |
| 2009/0097816 | A1 * | 4/2009 | Nakate | G11B 27/28 |
| | | | | 386/278 |
| 2009/0138816 | A1 | 5/2009 | Kawashima | |

FOREIGN PATENT DOCUMENTS

| | | |
|---|---|---|
| JP | 2008-032580 A | 2/2008 |
| JP | 2008-035280 A | 2/2008 |
| JP | 2009-59312 | 3/2009 |
| JP | 2009-129285 A | 6/2009 |
| JP | 2010-15256 | 1/2010 |
| JP | 2010-092246 A | 4/2010 |
| JP | 2010-092246 A | 4/2010 |
| JP | 2010-165117 | 7/2010 |
| JP | 2012-137822 A | 7/2012 |
| WO | 2010/122644 A1 | 10/2010 |

OTHER PUBLICATIONS

Notification of Reason for Refusal dated Dec. 5, 2017, from the corresponding Japanese Patent Application No. 2016-573173.
International Search Report and Written Opinion dated Nov. 17, 2015, from the corresponding PCT/JP2015/078478.
International Preliminary Report on Patentability dated Aug. 17, 2017, from the corresponding PCT/JP2015/078478.

* cited by examiner

VIDEO PROCESSING DEVICE

TECHNICAL FIELD

The present invention relates to a video processing device for controlling display of still images related to videos, and to a server device, a video processing method, a video processing program, and an information storage medium.

BACKGROUND ART

There are technologies that extract a plurality of frame images from a video and show the images as an image string. According to such technologies, a user can quickly find out an outline of a video or easily search for a desired scene by browsing the image string shown (refer, for example, to PTL 1).

CITATION LIST

Patent Literature

[PTL 1]
JP 2010-92246 A

SUMMARY

Technical Problem

In the above related art, even if all images obtained by extraction from a video cannot be shown at once on a screen, a user can search for a desired scene by causing an image string to scroll. However, when an image string including a large number of images is caused to scroll, and if scrolling is performed too fast, it becomes difficult for the user to perform scrolling while at the same time confirming the image string. On the other hand, if scrolling is performed too slowly, it takes too much time to search for a desired scene.

The present invention has been devised in light of the foregoing, and it is an object of the present invention to provide a video processing device that allows a user to quickly search for a desired scene while at the same time easily confirming details of an image string, and to a server device, a video processing method, a video processing program, and an information storage medium.

Solution to Problem

A video processing device according to the present invention includes a first image string acquisition section, a second image string acquisition section, and a display control section. The first image string acquisition section acquires a first image string made up of a plurality of frame images extracted from a video of interest. The second image string acquisition section acquires a second image string different from the first image string and made up of a plurality of frame images extracted from the video of interest. The display control section performs control such that the first image string is shown on a display device screen as an image string of interest. The display control section causes the frame images included in the first image string to scroll in response to a scrolling operation by a user while the first image string is shown and switches the image string of interest from the first image string to the second image string if the scrolling operation satisfies a given determination condition.

Also, another video processing device according to the present invention includes a first image string acquisition section, a second image string acquisition section, and a display control section. The first image string acquisition section acquires a first image string made up of a plurality of frame images extracted from a video of interest. The second image string acquisition section acquires a second image string different from the first image string and made up of a plurality of frame images extracted from the video of interest. The display control section performs control such that the first image string and the second image string are shown on a display device screen at the same time. The display control section causes the frame images included in the first image string and the second image string to scroll in response to a scrolling operation by a user while the first image string and the second image string are shown and suppresses the display of the frame images included in the first image string if the scrolling operation satisfies a given determination condition.

Also, a server device according to the present invention is a server device connectable to a video processing device and includes a transmission section that sends, to the video processing device, a video of interest and a control program used to control display of the video of interest. The control program causes the video processing device to perform a step of acquiring a first image string made up of a plurality of frame images extracted from the video of interest, a step of acquiring a second image string different from the first image string and made up of a plurality of frame images extracted from the video of interest, a step of performing control such that the first image string is shown on a display device screen as an image string of interest, a step of causing the frame images included in the first image string to scroll in response to a scrolling operation by a user while the first image string is shown, and a step of switching the image string of interest from the first image string to the second image string if the scrolling operation satisfies a given determination condition.

Also, a video processing method according to the present invention includes a step of acquiring a first image string made up of a plurality of frame images extracted from a video of interest, a step of acquiring a second image string different from the first image string and made up of a plurality of frame images extracted from the video of interest, a step of performing control such that the first image string is shown on a display device screen as an image string of interest, a step of causing the frame images included in the first image string to scroll in response to a scrolling operation by a user while the first image string is shown, and a step of switching the image string of interest from the first image string to the second image string if the scrolling operation satisfies a given determination condition.

Also, a program according to the present invention is a program for causing a computer to function as first image string acquisition means, second image string acquisition means, and display control means. The first image string acquisition means acquires a first image string made up of a plurality of frame images extracted from a video of interest. The second image string acquisition means acquires a second image string different from the first image string and made up of a plurality of frame images extracted from the video of interest. The display control means performs control such that the first image string is shown on a display device screen as an image string of interest. The display control means causes the frame images included in the first image string to scroll in response to a scrolling operation by a user while the first image string is shown and switches the image string of interest from the first image string to the second image string if the scrolling operation satisfies a given determination condition. This program may be provided stored in a computer-readable information storage medium.

DESCRIPTION OF EMBODIMENT

An embodiment of the present invention will be described below in detail based on drawings.

Figure 1:
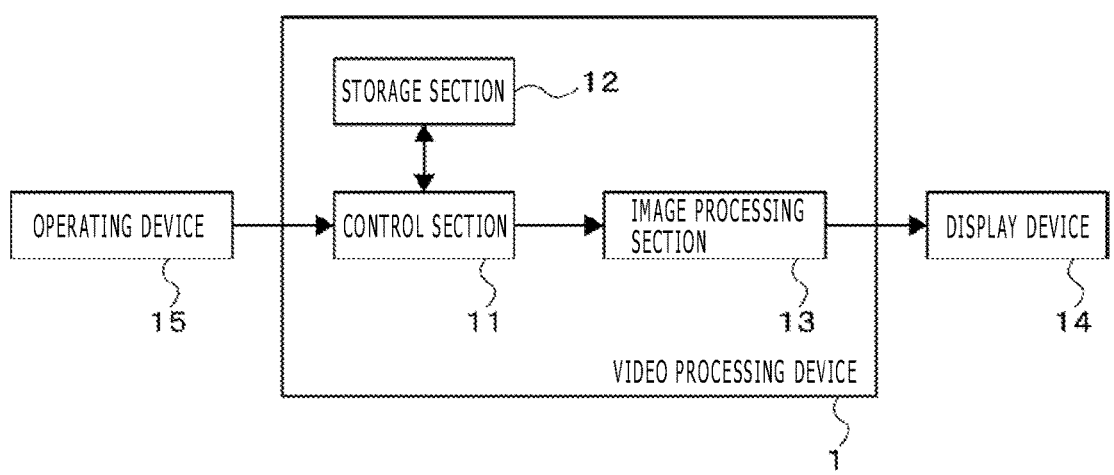
FIG. 1 is a configuration block diagram illustrating a configuration of a video processing device according to an embodiment of the present invention.

FIG. 1 is a configuration block diagram illustrating a configuration of a video processing device 1 according to an embodiment of the present invention. The video processing device 1 is, for example, a portable gaming device, a home gaming device, a personal computer, a smartphone, a video player, and so on and is configured to include a control section 11, a storage section 12, and an image processing section 13 as illustrated in this figure. Also, the video processing device 1 is connected to a display device 14 and an operating device 15.

The control section 11 is configured to include a central processing unit (CPU) and so on and performs various information processing tasks by executing a program stored in the storage section 12. It should be noted that specific examples of processes performed by the control section 11 in the present embodiment will be described later. The storage section 12 includes memory devices such as random access memory (RAM) and stores the program executed by the control section 11 and data processed by the program.

The image processing section 13 is configured to include a graphics processing unit (GPU) and so on and draws an image to be shown on the screen of the display device 14 in accordance with an instruction from the control section 11. The image drawn by the image processing section 13 is converted into a video signal and output to the display device 14. The display device 14 is a liquid crystal display, an organic electroluminescence (EL) display, or other display and shows an image that matches with the video signal input from the image processing section 13. Particularly in the present embodiment, the display device 14 shows, on the screen, an image of interest or an image string made up of a plurality of still images arranged as will be described later.

The operating device 15 is a keyboard and mouse, a home gaming device controller, and so on and accepts operation input from a user. It should be noted that both the display device 14 and the operating device 15 may be built into the housing of the video processing device 1 or may be separate devices connected to the video processing device 1 in a wired or wireless manner. The operating device 15 in particular may be a pushbutton or a touch panel arranged on a housing surface of the video processing device 1.

Figure 2:
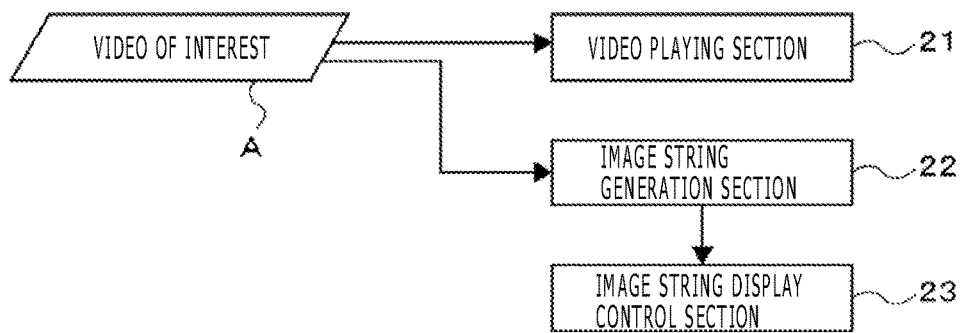
FIG. 2 is a functional block diagram illustrating functions of the video processing device according to the embodiment of the present invention.

A description will be given below of functions realized by the video processing device 1 using FIG. 2. As illustrated in FIG. 2, the video processing device 1 is configured to functionally include a video playing section 21, an image string generation section 22, and an image string display control section 23. These functions are realized as a result of operation of the control section 11 and the image processing section 13 in accordance with a program stored in the storage section 12. This program may be provided to the video processing device 1 via a communication network such as the Internet or may be stored in a computer-readable information storage medium such as optical disc and provided.

The video playing section 21 performs a video playing process. A video to be played by the video playing section 21 will be denoted below as a video of interest A. Data of the video of interest A may be stored in the storage section 12 in advance or read from an information storage medium such as optical disc. Alternatively, the data of the video of interest A may be received from an external device via a communication network. The video playing section 21 shows the video of interest A on the screen of the display device 14 by performing the playing process through decoding of the data of the video of interest A.

The image string generation section 22 generates an image string by extracting a plurality of frame images from the data of the video of interest A. The image string generated by the image string generation section 22 is shown on the screen of the display device 14 by the image string display control section 23 which will be described later. Specifically, the image string generation section 22 extracts data of each frame image to be extracted from the data of the video of interest A, draws the frame image, and reduces the frame image to a given size for use as a thumbnail image for display. Then, the image string generation section 22 generates an image string by arranging these thumbnail images in order of appearance in the video of interest A. The generated image string data is stored in a buffer reserved in the storage section 12.

Particularly in the present embodiment, the image string generation section 22 generates two image strings, a first image string S1 and a second image string S2. Frame images making up each of the image strings are selected from the video of interest A by a given selection rule. The given selection rule here is, for example, a rule for selecting frame images that appear at set time intervals in the video of interest A. It should be noted, however, that, depending on a data format of the video of interest A, frame images that cannot be directly extracted or frame images that require a relatively significant processing burden for extraction may be included in the video of interest A. In such a case, the image string generation section 22 may select, in place of frame images that select at strictly set time intervals, other frame images that appear at timings close to the frame images in the video of interest A and that are easily extractable as frame images to be extracted. The easily extractable frame images may be, for example, frame images that appear during scene changes or chapter changes and may be I-frames in moving picture experts group (MPEG) format data and so on.

Here, partially common frame images may be selected to make up the first image string S1 and the second image string S2 as components. As a whole, however, different frame images are selected to make up the first image string S1 and the second image string S2 as components. Particularly in the present embodiment, the second image string S2 is generated by extracting a plurality of frame images with longer time intervals in the video of interest A than frame images making up the first image string S1 as components. As a specific example, the image string generation section 22 selects frame images that appear at 15-second intervals as components making up the first image string S1 and selects frame images that appear at two-minute intervals as components making up the second image string S2 when the video of interest A is played.

The image string display control section 23 performs control such that the image strings generated by the image string generation section 22 are shown on the screen of the display device 14. It should be noted that a state in which the image string display control section 23 shows the image strings on the screen will be referred to below as scene search mode. The image string display control section 23 shows the image strings in response to an instruction to start scene search mode input by the user to the operating device 15 while the video playing section 21 plays the video of interest A or before the video playing section 21 plays the video of interest A. Also, in scene search mode, the image string that is to be shown by the image string display control section 23 and that is browsed mainly by the user will be referred to below as an image string of interest. When scene search mode starts, the first image string S1 is the image string of interest. Here, the image string display control section 23 arranges and shows only as many frame images as can fit into the screen rather than showing all the frame images included in the first image string S1.

Of the frame images shown within the screen in scene search mode, the frame image shown at a given position in the approximate center of the screen will be referred to below as a reference image R. Also, a playing time of the reference image R in the video of interest A will be referred to as reference time. The reference time at the start of scene search mode may be, for example, a playing start moment (00:00:00) of the video of interest A. Also, if the user instructs that scene search mode be started while the video of interest A is played, the reference time may be decided in accordance with the playing time of the video of interest A when the instruction is issued.

Figure 3:
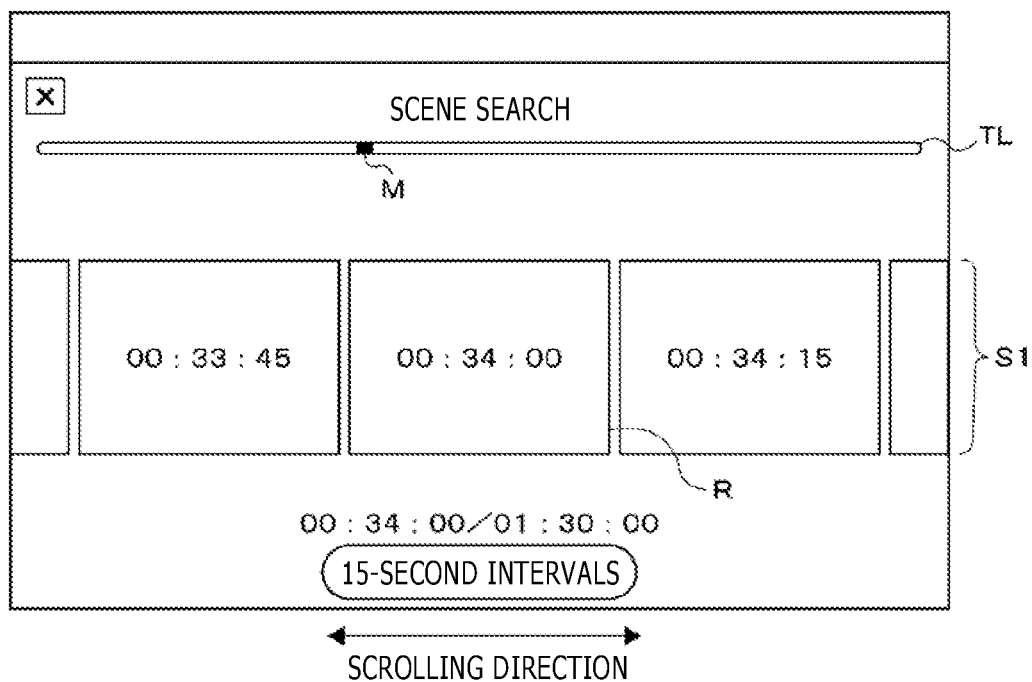
FIG. 3 is a diagram illustrating a display example of a first image string.

FIG. 3 illustrates an example of a screen in which the first image string S1 is shown. In the example of this figure, frame images included in the first image string S1 are arranged along the horizontal direction of the screen. It should be noted that we assume, in the description given below, that the frame images making up the image string are arranged linearly along the horizontal direction of the screen. However, the arrangement is not limited thereto, and the frame images in the image string may be arranged in any orientation as long as the order of the frame images can be identified by the user. Also, in the figures from FIG. 3 onward, details of the frame images shown within the screen will be omitted, and instead, the playing time at which that frame image is shown in the video of interest A will be stated. In the example of FIG. 3, the reference time (00:34:00 here) and total playing duration of the video of interest A (01:30:00 here) are shown under the first image string S1. Further thereunder, guidance display is arranged that provides guidance about time intervals between frame images (15-second intervals here) that make up the first image string S1 as components. It should be noted that the image string display control section 23 may highlight the reference image R in a manner distinguishable from other frame images, for example, by surrounding the reference image R with a frame border.

Also, a timeline bar TL appears above the first image string S1. This is a linear region that matches with the total playing duration of the video of interest A, and a left end and a right end match with the playing start moment (playing time 00:00:00) of the video of interest A and a playing end moment (playing time 01:30:00) of the video of interest A, respectively. Also, a marker image M highlighted on the timeline bar T represents bounds that match with a time span of the video of interest A represented by the first image string S1 appearing in the screen. Specifically, the left end position of the marker image M matches with the playing time when the frame image at the left end of the first image string S1 appearing in the screen appears in the video of interest A, and the right end position of the marker image M matches with the playing time when the frame image at the right end of the first image string S1 appearing in the screen appears.

With the first image string S1 appearing, the image string display control section 23 causes the frame images in the first image string S1 to scroll in response to a scrolling operation by the user. In the example of FIG. 3, the frame images are arranged along the horizontal direction of the screen. Therefore, the frame images scroll along the same direction as the arrangement direction (direction indicated by the arrows in the figure). Here, the scrolling operation is an instruction operation input to the operating device 15 by the user and may be, for example, an operation that indicates, by pressing an arrow button, a rightward or leftward direction. Also, if the operating device 15 includes a touch panel that is arranged to be superimposed on the screen of the display device 14, the scrolling operation may be a dragging operation or a flicking operation that moves a finger or a stylus horizontally on the touch panel. This scrolling operation allows the user to browse the plurality of frame images included from the playing start moment to the playing end moment of the video of interest A in a chronological order.

When the reference image R is switched sequentially by scrolling, a reference time also changes in response thereto. That is, the user's scrolling operation can be considered not only an operation for switching the reference image R but also an operation for advancing or turning back the reference time. As a specific example, it is assumed that the first image string S1 is made up of frame images extracted at 15-second intervals and that the scrolling operation is an operation that presses the right arrow button and the left arrow button. In this case, when the user presses the right arrow button once, the frame images included in the image string of interest scroll to the left. In response thereto, the reference image R is switched to the frame image arranged on the immediate right of the reference image R before the scrolling, and the reference time advances 15 seconds. Conversely, when the user presses the left arrow button once, the frame images included in the image string of interest scroll to the right. In response thereto, the reference image R is switched to the frame image arranged on the immediate left of the reference image R before then, and the reference time turns back 15 seconds.

If the user performs a given playing instruction operation on the operating device 15 after switching the reference image R to an arbitrary frame image by performing a scrolling operation, the video playing section 21 begins to play the video of interest A from the reference time that matches with the reference image R when the playing instruction is issued. According to such control, the user can search for a desired scene in the video of interest A by scene search mode and view the video of interest A from that scene.

Further, if the user's scrolling operation satisfies a given determination condition with the first image string S1 appearing, the image string display control section 23 switches the image string of interest shown on the screen from the first image string S1 to the second image string S2. Here, the determination condition for switching the image string is a condition for determining whether the user is attempting to scroll the image string significantly (or long). For example, this determination condition may be that an operation duration of the scrolling operation is equal to a given time period or more. More specifically, if the nature of the scrolling operation is to press a button, the image string display control section 23 switches the image string of interest when determining that the user has pressed and held that button for a given period of time or more. Alternatively, the determination condition for switching the image string may be that an operation amount of the scrolling operation is equal to a given value or more. The operation amount in this case may be an operation distance or an operation speed of the dragging operation.

As mentioned earlier, the time intervals between the frame images making up the second image string S2 are longer than the time intervals between frame images making up the first image string S1 in the video of interest A. For this reason, when the image string of interest is switched from the first image string S1 to the second image string S2, the extent to which the reference time changes each time the reference image R is switched by one image increases. That is, when the image string of interest is switched to the second image string S2, even if the scrolling speed of the frame images itself is the same as before the switching, the speed of change of the reference time is faster. As a specific example, if the first image string S1 is made up of frame images extracted at 15-second intervals, and if the second image string S2 is made up of frame images extracted at two-minute intervals, the speed of change of the reference time increases eight-fold by switching the image string of interest. For this reason, it is possible for the user to search for a desired scene by rapidly changing the reference time. Moreover, if the scrolling speed itself of the frame images remains unchanged before and after the switching of the image string of interest, the user can also search for a desired scene while at the same time visually recognizing the scrolling frame images after the switching.

Figure 4:
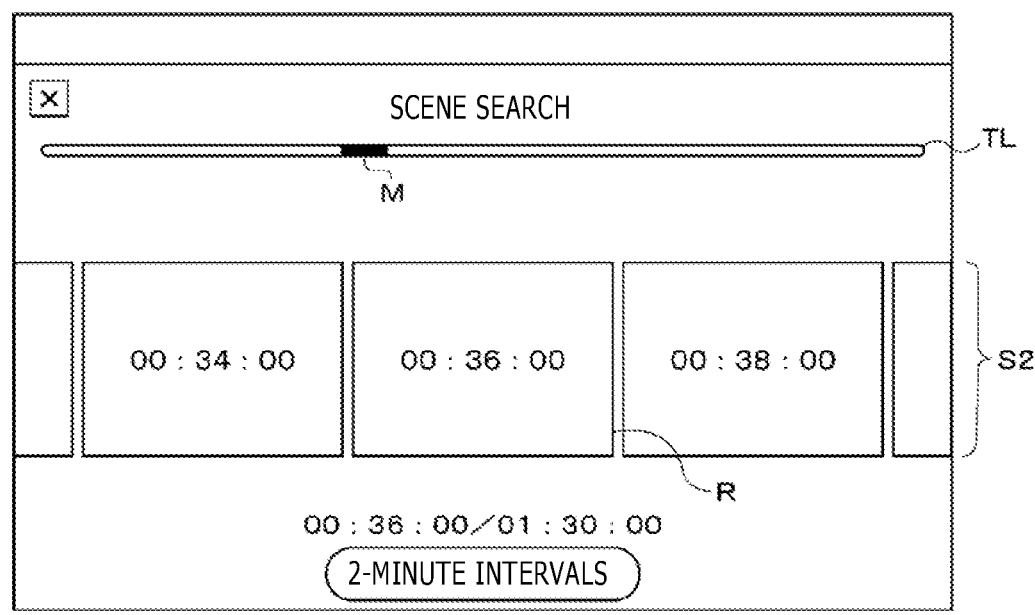
FIG. 4 is a diagram illustrating a display example of a second image string.

FIG. 4 illustrates a display example of a screen after the image string of interest is switched to the second image string S2. Here, the frame images have been switched to those included in the second image string S2, and the guidance display about time intervals at a lower portion of the screen have been switched from "15-second intervals" to "two-minute intervals." Also, the horizontal width of the marker image M highlighted on the timeline bar TL has changed approximately eight-fold from FIG. 3. The reason for this is that, as a result of the switching of the image string of interest to the second image string S2, the time span of the video of interest A represented by the frame images appearing in the screen has become longer. As illustrated in this figure, it is possible to inform the user that the image string of interest has been switched by switching the guidance display about time intervals and the marker image M on the timeline bar TL in response to the switching of the image string of interest.

It should be noted that the reference image R of the second image string S2 to be shown when the image string of interest is switched is selected to match with the playing time (reference time) of the reference image R of the first image string S1 shown at the time of switching. For example, if the image string switching determination condition is satisfied when the frame image shown at playing time t in the video of interest A is shown as the reference image R, the second image string S2 is shown with the frame image whose playing time is closest to the playing time t of the frame images making up the second image string S2 as the reference image R, and the scrolling of the frame images included in the second image string S2 continues. This allows the user to feel as if the scrolling also continues successively after the switching from the first image string S1 to the second image string S2.

Further, if the user terminates the scrolling operation after the scrolling continues following the switching the display to the second image string S2, the image string display control section 23 stops the scrolling of the frame images and switches the image string of interest from the second image string S2 back to the first image string S1. This makes it possible to switch the image string of interest to the second image string S2 only while the user performs the scrolling operation that satisfies the given determination condition.

In order to realize smooth switching the display to the second image string S2 as described above, it is preferable to generate the second image string S2 in advance before the scrolling operation satisfies the given determination condition. In the present embodiment, for this reason, the image string generation section 22 generates not only the first image string S1 to be shown first but also the second image string S2 and temporarily stores the first image string S1 and the second image string S2 in the storage section 12 when scene search mode begins. It should be noted that the image string generation section 22 need not generate, from the beginning, an image string whose length matches with the total playing duration of the video of interest A, and it is sufficient to prepare an image string that includes as many frame images as appear within the screen and their preceding and succeeding frame images that are likely to be shown at once. For this reason, when scene search mode begins, the image string generation section 22 generates the first image string S1 and the second image string S2 by extracting the frame image matching with the reference time and a given number of frame images before and after the reference time. Then, if the reference time changes as a result of the scrolling operation by the user, both the first image string S1 and the second image string S2 are updated by extracting and adding new frame images in such a manner as to cover the time spans before and after the reference time after the change. This allows the image string display control section 23 to switch the display between the first image string S1 and the second image string S2 immediately with relatively small processing load without keeping the user waiting.

Although, in the above description, the second image string S2 appears within the screen in the same manner as the first image string S1, the image string display control section 23 may show the second image string S2 in a different manner from the first image string S1. As the manner of showing the first image string S1 and the second image string S2 changes, the user can intuitively find out that the image string of interest has been switched. A description will be given below of several examples of how to change the manner of showing the second image string S2.

Figure 5:
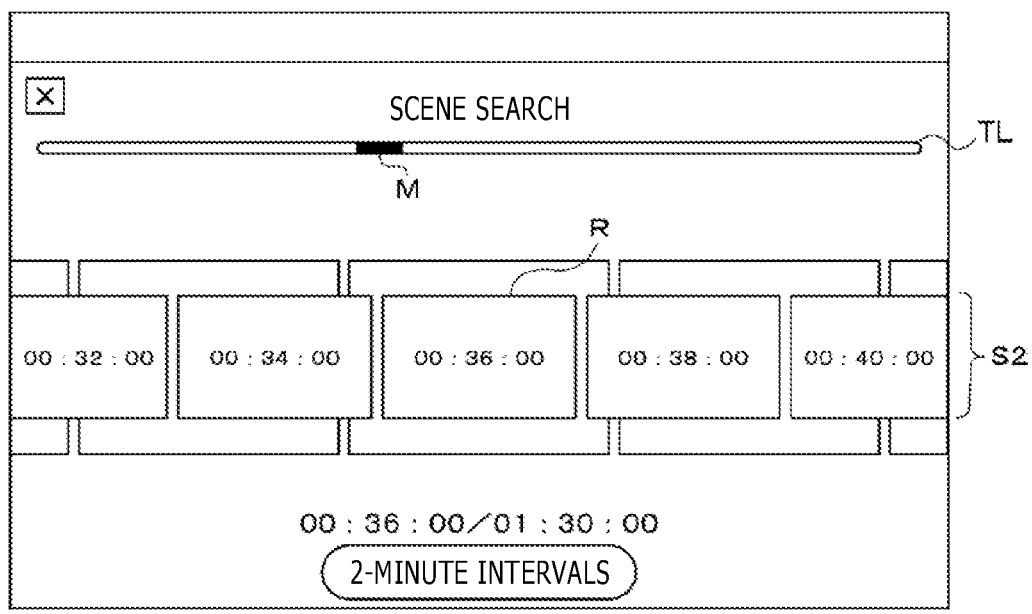
FIG. 5 is a diagram illustrating a first example in which the first image string and the second image string are shown in different manners.

As a first example, the image string display control section 23 may show the second image string S2 at a different size from the first image string S1. FIG. 5 illustrates a display example in this case. In the example of this figure, when the image string of interest is switched from the first image string S1 to the second image string S2, the size of each of the frame images included in the image string of interest has become smaller than before the switching.

Figure 6:
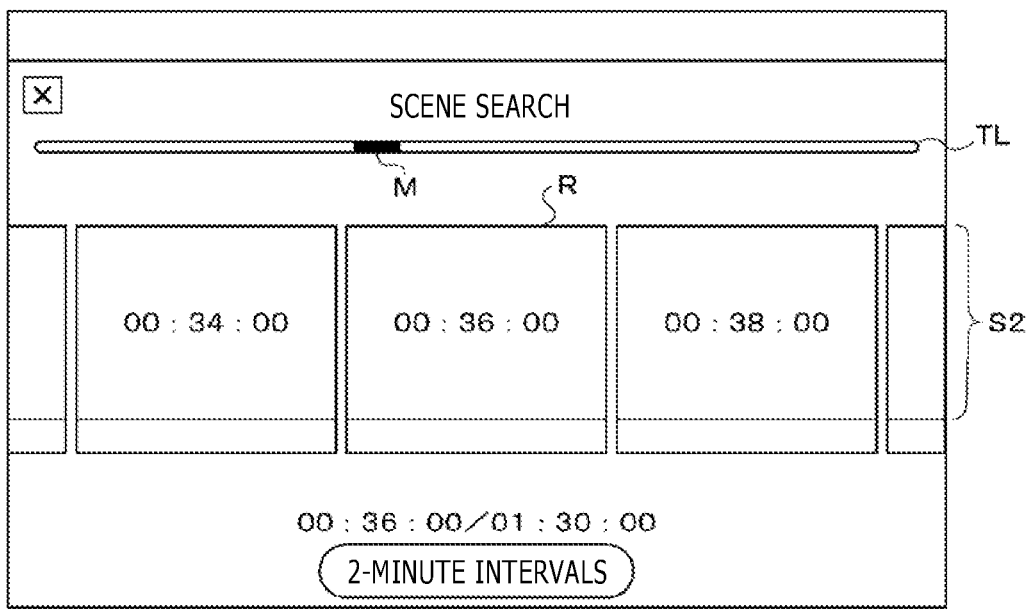
FIG. 6 is a diagram illustrating a second example in which the first image string and the second image string are shown in different manners.

As a second example, the image string display control section 23 may show the second image string S2 at a different position from the first image string S1. FIG. 6 illustrates a display example in this case. In the example of this figure, when the image string of interest is switched, the image string of interest as a whole has moved more upward than before the switching.

It should be noted that, in both the first example and the second example, when the image string of interest is switched to the second image string S2, border images that represent the positions and sizes of the frame images included in the first image string S1 may be shown at the positions where the first image string S1 was shown. This allows the user to recognize more clearly that the image string of interest has been switched to the second image string S2 by comparing against the border images. Both FIG. 5 and FIG. 6 illustrate examples in which border images appear. Alternatively, the first image string S1 may be continuously shown such that the first image string S1 overlaps a back side of the second image string S2 rather than showing border images.

Figure 7A:
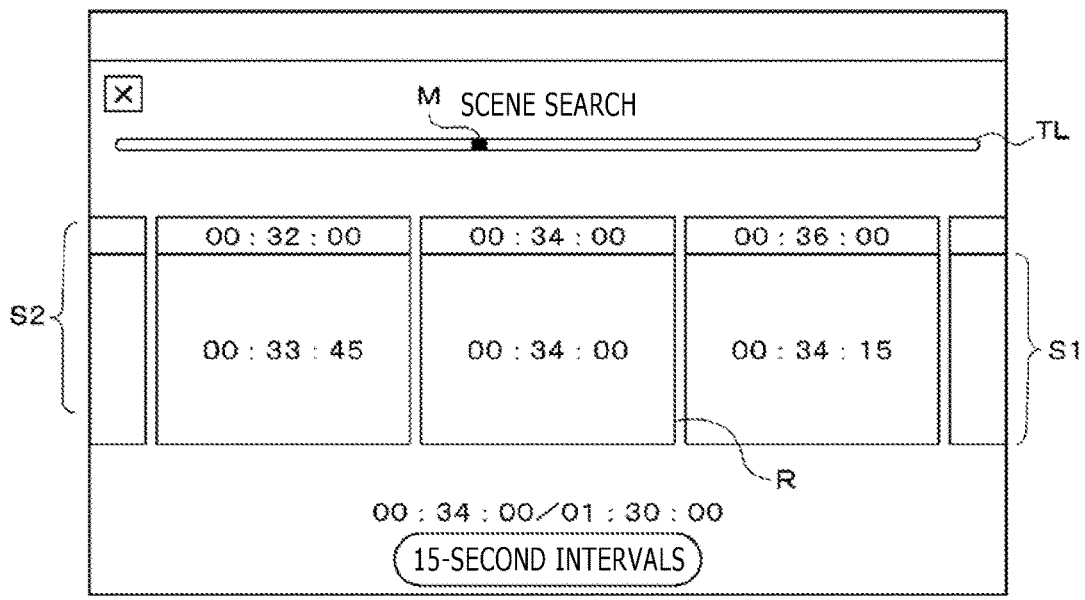
FIG. 7A is a diagram illustrating a display example before switching of an image string of interest in a third example in which the first image string and the second image string are shown in different manners.

As a third example, the image string display control section 23 may partially show the second image string S2 from before the switching of the display of the image string of interest. FIG. 7A illustrates a display example before the switching of the image string of interest in the third example. Although, in the example of this figure, the first image string S1 appears as the image string of interest, the second image string S2 also appears where part of the second image string S2 overlaps the first image string S1. It should be noted that this figure illustrates a state in which the image string of interest is the first image string S1. Therefore, the first image string S1 appears on the front of the second image string S2, and as for each of the frame images included in the second image string S2, the entire image does not appear, and part of the image is hidden.

Figure 7B:
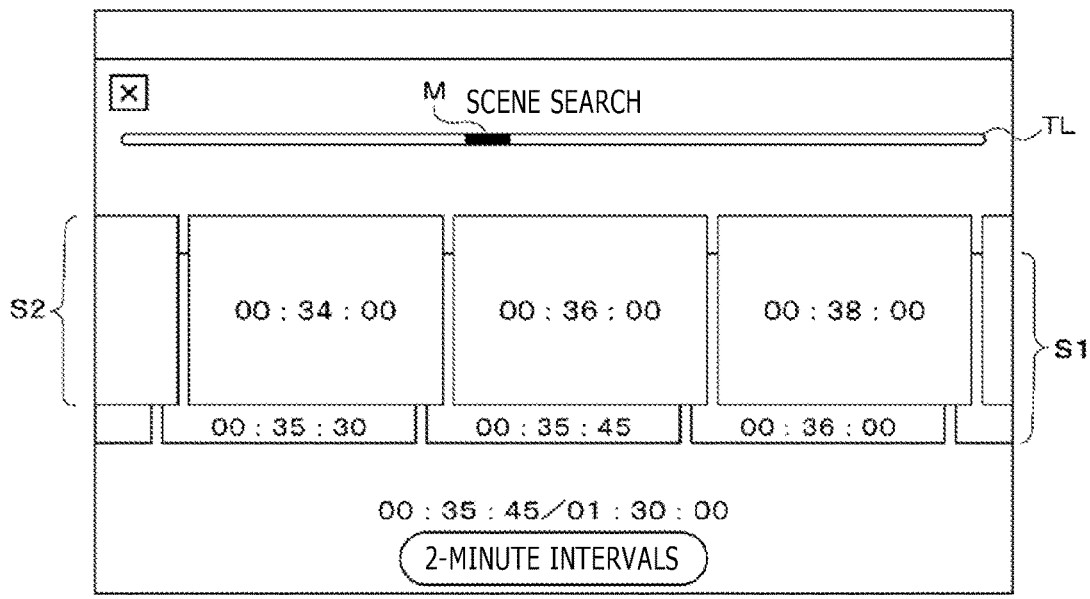
FIG. 7B is a diagram illustrating a display example after switching of an image string of interest in the third example in which the first image string and the second image string are shown in different manners.

If, in this example, the scrolling operation satisfies the given determination condition, the image string display control section 23 maintains the display position of the second image string S2 unchanged and switches the display such that the second image string S2 appears on the front of the first image string S1. As a result, the image string of interest becomes the second image string S2, and as for at least some of the frame images included in the second image string S2, the entire image can be confirmed by the user, and each of all the frame images included in the first image string S1 is partially hidden. FIG. 7B illustrates a display example after such switching of the image string of interest.

It should be noted that FIG. 7B illustrates the switching of the reference image R in progress.

In this third example, when the scrolling operation is performed, the image string display control section 23 causes the first image string S1 and the second image string S2 to scroll in a coordinated fashion (i.e., at timings where the reference times of the two match with each other). As a specific example, if the first image string S1 is made up of frame images extracted at 15-second intervals, and if the second image string S2 is made up of frame images extracted at two-minute intervals, the image string display control section 23 scrolls one frame image included in the second image string S2 each time the image string display control section 23 scrolls eight frame images included in the first image string S1. It should be noted, however, that when the two are scrolled in a coordinated fashion, and if the image string of interest is switched to the second image string S2, the first image string S1 scrolls at an eight-fold speed as compared to when the image string of interest is the first image string S1. As a result, there is not plenty of time for the image string generation section 22 to perform a process of extracting and drawing frame images to be added anew to the first image string S1 during scrolling, and it becomes difficult for the user to visually recognize the frame images that are scrolling at high speed. For this reason, the image string display control section 23 may suppress the display of the first image string S1 while the image string of interest is switched to the second image string S2. More specifically, when the image string of interest is switched to the second image string S2, the image string display control section 23 performs control such that only border images that match with the positions and sizes of the frame images included in the first image string S1 that appeared until then are shown and details of the frame images included in the first image string S1 are not shown on the screen. This makes it possible to avoid the problem that the process of generating the first image string S1 by the image string generation section 22 is too late for scrolling.

It should be noted that if the first image string S1 and the second image string S2 are shown at the same time within the screen as described above, the user may be allowed to directly scroll the image strings other than the image string of interest. As a specific example, if the scrolling operation is a dragging operation on the touch panel in the display example of FIG. 7A, the user may perform the dragging operation on the shown portions of the second image string S2 that are exposed on top of the first image string S1. In this case, the image string display control section 23 performs display control such that the image string of interest is immediately switched to the second image string S2 to cause each image string to scroll.

Figure 8A:
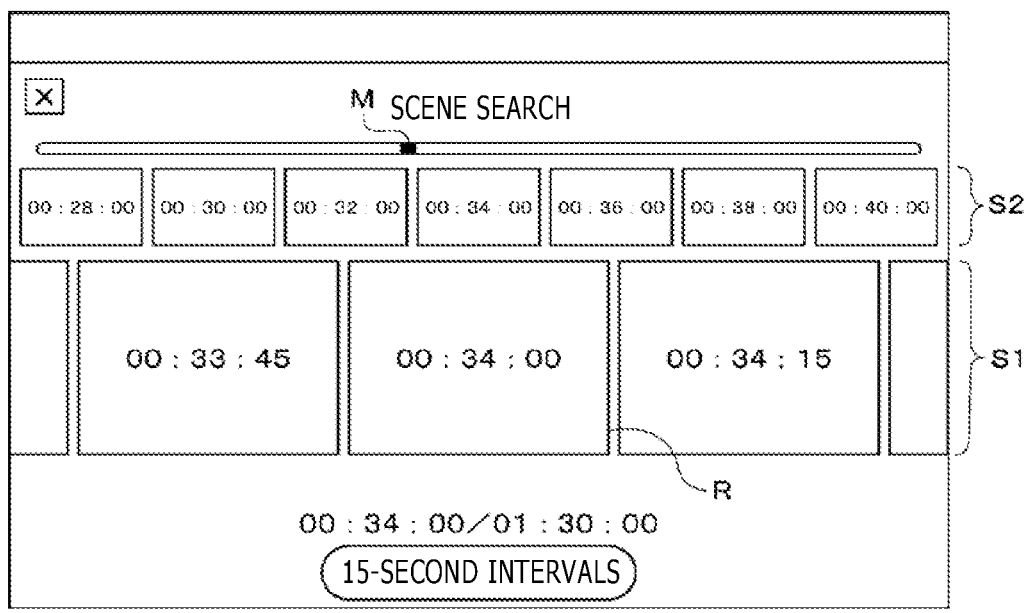
FIG. 8A is a diagram illustrating a display example before switching of an image string of interest in a fourth example in which the first image string and the second image string are shown in different manners.

As a fourth example, the image string display control section 23 may show the first image string S1 and the second image string S2 side by side before the switching of the image string of interest. In this example, unlike the third example, at least some of the frame images included in the second image string S2 are entirely shown within the screen from before the switching of the image string of interest. FIG. 8A illustrates a display example before the switching of the image string of interest in this example. In FIG. 8A, the frame images included in the first image string S1 and the frame images included in the second image string S2 differ in size, and the frame images included in the second image string S2 appear in a smaller size.

If the user performs the scrolling operation in the fourth example, the image string display control section 23 causes the two image strings to scroll in a coordinated fashion similarly to the third example. Then, if the image string of interest is switched from the first image string S1 to the second image string S2 because the user's scrolling operation satisfies the given determination condition, the image string display control section 23 switches the guidance display about time intervals at the lower portion of the screen from the time intervals of the first image string S1 (e.g., "15 seconds") to the time intervals of the second image string S2 (e.g., "two minutes") and changes the horizontal width of the marker image M on the timeline bar TL to match with the second image string S2. As a result, if the user performs the scrolling operation that satisfies the given determination condition, it is possible to indicate to the user that the image string of interest has been switched despite the fact that the display positions and the sizes of the first image string S1 and the second image string S2 remain unchanged. Also, in the fourth example, the image string display control section 23 may highlight the reference image R of the image string of interest, for example, by adding a frame border to the reference image R thereof. This allows the user to recognize, of the two image strings shown at the same time, the image string including the reference image R to which a frame border has been added as the image string of interest.

It should be noted that because, in this fourth example, both the first image string S1 and the second image string S2 are shown on the screen at the same time, two kinds of time intervals such as "15-second intervals (two-minute intervals)" may be given for the guidance display about time intervals at the lower portion of the screen.

Figure 8B:
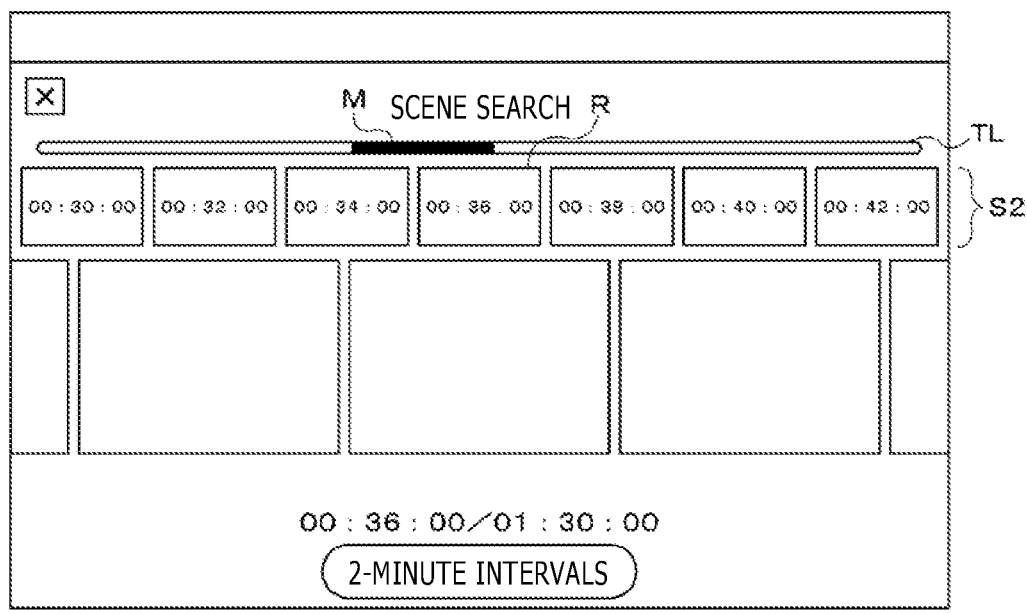
FIG. 8B is a diagram illustrating a display example after switching of an image string of interest in the fourth example in which the first image string and the second image string are shown in different manners.

Also, in the fourth example as in the third example, the image string display control section 23 may suppress the display of the frame images included in the first image string S1 after the switching of the image string of interest to the second image string S2. FIG. 8B illustrates a display example when the display of the frame images included in the first image string S1 is suppressed by replacing the frame images with border images. Further, rather than performing control such that details of the frame images included in the image string not selected as the image string of interest are not shown at all, the image string display control section 23 may perform a color conversion process such that the image string not selected as the image string of interest is less conspicuous including reducing the brightness thereof, increasing the transparency, and converting into a monochrome image. By suppressing the display of the first image string S1 by such a color conversion process, the image string display control section 23 can guide the user to focus attention on the second image string S2.

According to the video processing device 1 according to the embodiment of the present invention described above, if an image string is caused to scroll to present an outline of the video of interest A to a user, it is possible to allow the user to visually recognize each of the frame images included in the image string with ease while at the same time increasing the change amount of the reference time when the scrolling continues. For this reason, the user can rapidly search for a desired scene in the video of interest A.

It should be noted that embodiments of the present invention are not limited to the embodiment described above. For example, although the image string generation section 22 generated only two image strings in the above description, the image string generation section 22 may generate three or more image strings having different time intervals from each other. In this case, by gradually switching the image string of interest in accordance with the nature of the scrolling operation, it is possible to enhance a degree of flexibility for the user to change the reference time.

Also, in the above description, each image string was acquired as the video processing device 1 generated the first image string S1 and the second image string S2 by itself. However, these image strings may be generated by a separate device from the video processing device 1. For example, there is a case in which a server device connected to the video processing device 1 via a communication network such as the Internet delivers the video of interest A to the video processing device 1. In this case, the server device may generate the first image string S1 and the second image string S2 by deciding on frame images to be extracted and extracting the frame images from the video of interest A. In this example, the server device sends image data of the frame images making up each of the image strings generated to the video processing device 1 in response to a request from the video processing device 1. The video processing device 1 acquires each of the image strings by receiving the image data from the server device and shows the image strings on the screen of the display device 14. Also in this case, the image string display control section 23 of the video processing device 1 can realize display control similar to those described earlier such as scrolling of the image strings and switching of the image string of interest by using the image strings acquired from the server device.

Also, the process of acquiring the image strings and performing display control as described above may be realized by a control program delivered from the server device. For example, if the video of interest A is delivered by the server device as described earlier, the server device may deliver a control program for showing the video of interest A together with the video of interest A. Further, this control program may be written in a script language, embedded in hypertext markup language (HTML) data of a webpage and so on, and delivered to the video processing device 1 from the server device. In this case, when a browser program or other program is executed to show the webpage, the video processing device 1 realizes the acquisition of image strings, the image string scrolling control, the switching control of the image string of interest, and so on by executing the control program included in the HTML data.

Also, although, in the above description, the video processing device 1 was a terminal device on the client side directly used by the user, a server device that delivers the video of interest A to the client terminal may function as the video processing device 1. In this case, operation information indicating details of operation of the scrolling operation or other operation performed on the client terminal is sent to the server device. The server device extracts frame images from the video of interest A, generates the first image string S1 and the second image string S2, and generates a screen to be shown on the display device connected to the client terminal using the generated image strings. Also, the scrolling of the image strings and the switching of the image string of interest are controlled in accordance with the operation information received from the client terminal, and the screen to be shown on the client terminal side is updated in accordance with the result thereof. This allows the user using the client terminal to browse the image strings in a similar manner when the client terminal functions as the video processing device 1.

REFERENCE SIGNS LIST

1 Video processing device, 11 Control section, 12 Storage section, 13 Image processing section, 14 Display device, 15

Operating device, 21 Video playing section, 22 Image string generation section, 23 Image string display control section.

The invention claimed is:

1. A video processing device comprising:
a first image string acquisition section adapted to acquire a first image string comprising a first plurality of single frame images extracted from a video of interest,
wherein the first plurality of single frame images are separated, in the video of interest, by a first fixed time interval, and
wherein the first plurality of single frame images are all non-consecutive frame images from the video of interest;
a second image string acquisition section adapted to acquire a second image string different from the first image string and comprising a second plurality of single frame images extracted from the video of interest,
wherein the second plurality of single frame images are separated, in the video of interest, by a second fixed time interval,
wherein the second plurality of single frame images are all non-consecutive frame images from the video of interest, and
wherein the second fixed time interval is greater than the first fixed time interval; and
a display control section adapted to perform control such that the first image string is shown as separated image frames on a display device screen as an image string of interest, wherein
the display control section causes the single frame images included in the first image string to scroll in response to a scrolling operation by a user while the first image string is shown and switches the image string of interest from the first image string to the second image string and shows the single frame images included in the second image string (a) as scrolling and (b) in a different manner from the first image string if the scrolling operation satisfies a given determination condition.

2. The video processing device of claim 1, wherein the display control section shows the single frame images making up the second image string at a different size from the single frame images making up the first image string.

3. The video processing device of claim 1, wherein the display control section concurrently shows the second image string at a different position from the first image string in the screen.

4. The video processing device of claim 3, wherein the display control section shows the second image string overlapping the first image string while the first image string appears and shows the second image string on a front of the first image string when the display of the image string of interest is switched.

5. The video processing device of claim 1, wherein the display control section shows a progress bar including a marker that matches, on the progress bar, with a playing time of the video of interest on the screen and, while either the first image string or the second image string is displayed as the image string of interest, a width of the marker is adjusted to a first width when the first image string is shown and to a second width when the first image string is shown, wherein the first width is different than the second width.

6. A video processing device comprising:
a first image string acquisition section adapted to acquire a first image string comprising a first plurality of single frame images extracted from a video of interest,
wherein the first plurality of single frame images are separated, in the video of interest, by a first fixed time interval, and
wherein the first plurality of single frame images are all non-consecutive frame images from the video of interest;
a second image string acquisition section adapted to acquire a second image string different from the first image string and comprising a second plurality of single frame images extracted from the video of interest,
wherein the second plurality of single frame images are separated, in the video of interest, by a second fixed time interval,
wherein the second plurality of single frame images are all non-consecutive frame images from the video of interest, and
wherein the second fixed time interval is greater than the first fixed time interval; and
a display control section adapted to perform control such that the first image string and the second image string are shown as separated frame images on a display device screen at the same time, wherein
the display control section causes the single frame images included in the first image string and the single image frames included in the second image string to scroll in response to a scrolling operation by a user while the first image string and the second image string are shown and suppresses the display of the single frame images included in the first image string if the scrolling operation satisfies a given determination condition.

7. A server device connectable to a video processing device, the server device comprising:
a transmission section adapted to send, to the video processing device, a video of interest and a control program used to control display of the video of interest, wherein
the control program for the video processing device, includes
acquiring a first image string made up of a first plurality of single frame images extracted from the video of interest, and
wherein the first plurality of single frame images are separated, in the video of interest, by a first fixed time interval, and
wherein the first plurality of single frame images are all non-consecutive frame images from the video of interest;
acquiring a second image string different from the first image string and comprising a second plurality of single frame images extracted from the video of interest,
wherein the second plurality of single frame images are separated, in the video of interest, by a second fixed time interval,
wherein the second plurality of single frame images are all non-consecutive frame images from the video of interest, and
wherein the second fixed time interval is greater than the first fixed time interval; and
performing control such that the first image string is shown on a display device screen as an image string of interest, causing the single frame images included in the first image string to scroll, while being displayed as separated frame images, in response to a scrolling operation by a user while the first image string is shown, and switching the image string of interest from the first image string to the second image string and showing the single frame images included in the second image string (a) as scrolling and (b) in a different manner from the first image string if the scrolling operation satisfies a given determination condition.

8. A video processing method comprising:

acquiring a first image string made up of a first plurality of single frame images extracted from the video of interest, wherein the first plurality of single frame images are separated, in the video of interest, by a first fixed time interval, and wherein the first plurality of single frame images are all non-consecutive frame images from the video of interest;

acquiring a second image string different from the first image string and comprising a second plurality of single frame images extracted from the video of interest wherein the second plurality of single frame images are separated, in the video of interest, by a second fixed time interval, wherein the second plurality of single frame images are all non-consecutive frame images from the video of interest, and wherein the second fixed time interval is greater than the first fixed time interval; performing control such that the first image string is shown on a display device screen as an image string of interest;

causing the single frame images included in the first image string to scroll, as separated frame images, in response to a scrolling operation by a user while the first image string is shown; and switching the image string of interest from the first image string to the second image string and showing the single frame images included in the second image string (a) as scrolling and (b) in a different manner from the first image string if the scrolling operation satisfies a given determination condition.

9. A non-transitory computer readable medium having stored thereon a program for a computer, the program comprising:

by a first image string acquisition section, acquiring a first image string comprising a first plurality of single frame images extracted from a video of interest, wherein the first plurality of single frame images are separated, in the video of interest, by a first fixed time interval, and wherein the first plurality of single frame images are all non-consecutive frame images from the video of interest;

by a second image string acquisition section, acquiring a second image string different from the first image string and comprising a second plurality of single frame images extracted from the video of interest, wherein the second plurality of single frame images are separated, in the video of interest, by a second fixed time interval, wherein the second plurality of single frame images are all non-consecutive frame images from the video of interest, and wherein the second fixed time interval is greater than the first fixed time interval; and by a display control section, performing control such that the first image string is shown as separated frame images on a display device screen as an image string of interest, wherein the display control section causes the single frame images included in the first image string to scroll in response to a scrolling operation by a user while the first image string is shown, and switches the image string of interest from the first image string to the second image string and shows the single frame images included in the second image string (a) as scrolling and (b) in a different manner from the first image string if the scrolling operation satisfies a given determination condition.

* * * * *